W. B. Emery,
Wood Plane Attachment.
N° 12,438.    Patented Feb. 27, 1855.

Witnesses:
James B Sander
A. V. Delbitt

Inventor:
William B. Emery

UNITED STATES PATENT OFFICE.

WILLIAM B. EMERY, OF ALBANY, NEW YORK.

METHOD OF ADJUSTING STUFF IN PLANING-MACHINES.

Specification of Letters Patent No. 12,438, dated February 27, 1855.

*To all whom it may concern:*

Be it known that I, WILLIAM B. EMERY, of the city and county of Albany, in the State of New York, have invented a new and useful Method of Adjusting Stuff in a Planing-Machine for the Purpose of Producing Uniformity of Size and Shape, with Ease, Rapidity, and Accuracy; and I do hereby declare that the following is a full, clear, and exact description of the construction and operation of the same, reference being had to the annexed drawings, making a part of this specification, in which—

Figure 1:
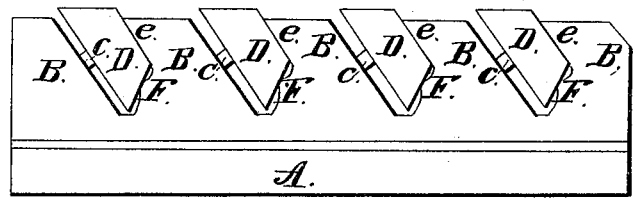
Figure 2:
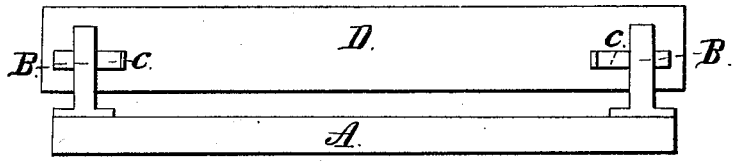

Figure 1 an end view and Fig. 2 a side view, like letters of reference on each figure referring to like parts.

A is a bed plate of iron or any suitable material.

B B B B are teeth projecting from it between which the pieces to be planed are made fast by means of the wedges C, C, C, C. These teeth are carefully adjusted to the required angle so that the pieces D, D, &c., on being forced against the faces E, E, E, E, by the wedges must assume a proper and uniform position one side of the pieces having been previously planed if necessary.

F is a stop or rest which regulates the width or depth of the pieces. These teeth may be multiplied to any practical extent so that many pieces may be fastened in them at the same time. When adjusted as shown in the drawing, the whole is passed under the cutters of the planing machine (of whatever construction) this reduces the surfaces thus operated upon to one common plane and all the pieces to a common width and a common angle. By turning the pieces the several sides may be successively planed if desired. The teeth may be at right, as well as oblique angles to the bed plate.

Having thus described my invention what I claim as my invention and desire to secure by Letters Patent of the United States is—

1. The bed plate A of iron or other suitable material provided with teeth projecting from it and adjusted at suitable angles together with the wedges or their equivalent—constructed substantially as and for the purpose described.

2. I claim the bed plate and wedges substantially as described in combination with any suitable planing machine.

WM. B. EMERY.

Witnesses:
 JAMES B. SANDERS,
 A. N. DE WITT.